United States Patent [19]

Mori

[11] Patent Number: 4,639,777

[45] Date of Patent: Jan. 27, 1987

[54] APPARATUS FOR SCRAMBLING AND DESCRAMBLING COMMUNICATION SIGNALS

[75] Inventor: Hitoshi Mori, Kobe, Japan

[73] Assignee: Matsushita Electric Industrial Co., Ltd., Osaka, Japan

[21] Appl. No.: 681,368

[22] Filed: Dec. 13, 1984

[30] Foreign Application Priority Data

Dec. 16, 1983 [JP] Japan ............................. 58-238103

[51] Int. Cl.⁴ ..................... H04N 7/167; H04K 1/02
[52] U.S. Cl. .................................... 358/120; 358/118
[58] Field of Search ............... 358/114, 120, 122, 118

[56] References Cited

U.S. PATENT DOCUMENTS

| | | | |
|---|---|---|---|
| 3,999,005 | 12/1976 | Dickinson | 358/114 |
| 4,034,402 | 7/1977 | Brian | 358/114 |
| 4,336,553 | 6/1982 | den Toonder et al. | 358/120 |
| 4,338,628 | 7/1982 | Payne et al. | 358/120 |
| 4,396,946 | 8/1983 | Bond | 358/120 |
| 4,467,353 | 3/1982 | Citta et al. | 358/120 |

Primary Examiner—Stephen C. Buczinski
Assistant Examiner—Melissa Koltak
Attorney, Agent, or Firm—Birch, Stewart, Kolasch & Birch

[57] ABSTRACT

Of the scrambling systems used in CATV and direct satellite broadcasting systems, the invention pertains to the transmission of a keying signal for demodulation. The keying signal, as a carrier wave displaced 90° in phase from a picture carrier wave, is superimposed on the conventional sync signal suppression period with no sound carrier wave being processed, thereby avoiding the generation of buzzing noise which would occur when the keying signal is superimposed on the sound carrier wave. With this invention, not only can the generation of buzzing noises be eliminated, but also even in multiplex sound systems the sound signal can be transmitted without the sound quality being adversely affected. Also, no synchronizing signal can readily and easily be detected and, therefore, subscription TV programs can not be viewed by unauthorized persons.

7 Claims, 5 Drawing Figures (a) Modulated Picture Carrier Wave Suppressed According to Gated Sync. Suppression Sync. Signal Suppressing Period (b) 90° Phase Shifted Burst Signal (c) Modulated Picture Carrier Wave Superimposed With Keying Signal (a) Video Signal (b) Horizontal Flyback Signal (c) Normal Picture Carrier Wave Modulated by Video Signal (d) Modulated Picture Carrier Wave Suppressed According to Gated Sync. Suppression (e) Sound Carrier Wave Superimposed With Keying Signal (a) Modulated Picture Carrier Wave Suppressed According to Gated Sync. Suppression (b) 90° Phase Shifted Burst Signal (c) Modulated Picture Carrier Wave Superimposed With Keying Signal

APPARATUS FOR SCRAMBLING AND DESCRAMBLING COMMUNICATION SIGNALS

BACKGROUND OF THE INVENTION

The present invention relates to the transmission of a keying signal for demodulation based on the gated sync suppression principle of a scrambling system such as used in CATV systems and satellite communication systems.

In CATV systems and direct satellite broadcasting (DBS) systems, a video signal of the pay-TV program is scrambled so that the pay-TV program can be viewed only by subscribers. Numerous methods for scrambling the video signal have hitherto been proposed, but the scrambling method based on the principle of gated sync suppression is currently widely used. According to the gated sync suppression principle of scrambling, the level of a video carrier wave including a color burst during each horizontal flyback period is suppressed 6 dB so that, when the video carrier wave is received by a usual television receiver set, a sync separator in the television receiver (except for that owned by an authorized subscriber) is unable to properly separate the synchronizing pulses from the video signal thereby to rendering the reproduction of the picture carried by the video signal unviewable. The manner by which the video signal is scrambled according to the gated sync suppression principle is shown in FIG. 1, while a scrambler circuit for scrambling the video signal is shown in FIG. 2. Referring first to FIG. 1, the waveform (a) represents a video signal, the waveform (b) represents a horizontal flyback signal included in the video signal (a), the waveform (c) represents the picture carrier wave modulated by the video signal (a), the waveform (d) represents the picture carrier wave modulated by the video signal (a), which is in a scrambled form, i.e., in which the horizontal flyback period is suppressed 6 dB, and the waveform (e) represents a frequency-modulated sound carrier wave superimposed with a keying signal used to restore the signal (d) to the original waveform.

In order to obtain the signals (a) and (e), referring to FIG. 2, when the signal (a) shown in FIG. 1 is applied from a video signal input 201, a synchronizing signal is separated in a sync separator 202. At the same time, the signal from the video signal input 201, after having been delayed a predetermined time by a delay circuit 203 and after having subsequently DC-clamped in a clamp circuit 204 by a clamp pulse 205 fed from the sync separator 202, is modulated at an intermediate frequency by a video modulator 206. An output signal from the video modulator 206 is fed to a sync suppressor 207 at which only the horizontal flyback period is suppressed 6 dB. A gated suppressing signal 210 generated from a keying signal generator 209 in synchronism with a separated synchronizing signal 208, that is, a signal corresponding to the waveform (b) shown in FIG. 1, is applied to the sync suppressor 207, and accordingly, a synchronizing portion is suppressed in response to such signal. On the other hand, a sound signal applied to a sound signal input 211, after having been frequency-modulated in an FM modulator 212, is amplutide-modulated in an AM modulator 214 by a keying signal 213 fed from the keying signal generator 209. Accordingly, an output from the AM modulator 214 represents such a double modulated waveform as shown by (e) in FIG. 1. These two outputs, after having been combined together, are converted by a frequency converter 215 to a desired frequency, and are then outputed through a BPF circuit 216 as an RF outputs 217. The waveforms of the respective RF output 217 are shown by (d) and (e) in FIG. 1, respectively. As can be understood from FIG. 1, since the sound carrier wave is amplutide-modulated, a phase displacement takes place during the process thereof and mixes in the frequency-modulated wave, resulting in that the sound signal subsequently restored contains buzzing noises. In addition, in the case of TV multiplex sound broadcasting, since the keying signal has a frequency component equal to the horizontal period, buzzing noises tend to be reproduced during descrambling.

SUMMARY OF THE INVENTION

The present invention has been devised with a view toward eliminating the drawback inherent in the prior art system that, in the scrambling method based on the gated sync suppression principle, the keying signal for restoring the synchronizing signal is transmitted by amplitude-modulating it on the sound carrier wave, and has for its object to provide a keying signal transmission system wherein, since the keying signal is not superimposed on the sound carrier wave such as in the prior art, no buzzing sound is produced and a multiplex sound signal can also be transmitted freely.

According to the present invention, the keying signal for restoring the synchronizing signal is superimposed on the picture carrier wave and, more specifically, a burst-like carrier wave displaced 90° in phase relative to the picture carrier wave is superimposed on a sync signal suppressed portion of the conventional picture carrier wave. Therefore, no sound carrier wave is processed in any way and, therefore, no buzzing noises are produced and the multiplex sound signal can be transmitted freely.

BRIEF DESCRIPTION OF THE DRAWINGS

This and other objects and features of the present invention can be readily understood from the following description taken in conjunction with a preferred embodiment thereof with reference to the accompanying drawings, in which.

DETAILED DESCRIPTION OF THE EMBODIMENT

Figure 1:
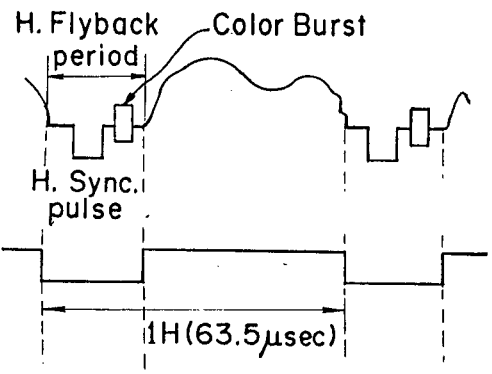
FIG. 1 is a diagram showing various waveforms used to explain the prior art scrambling method based on the gated sync suppression principle.
Figure 1:
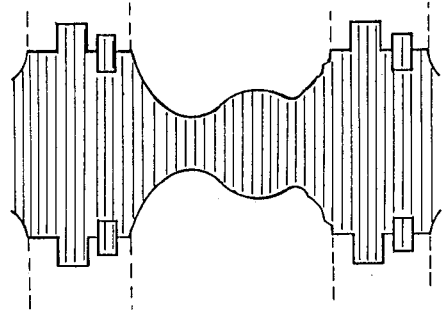
Figure 1:
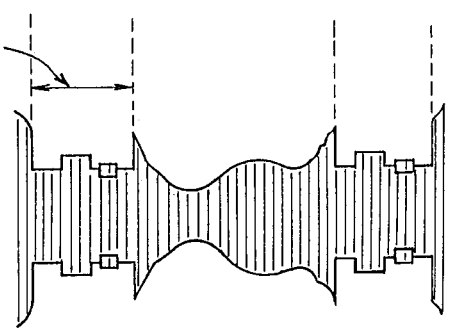
Figure 1:
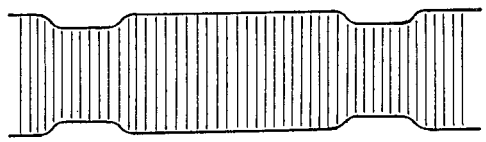
Figure 2:
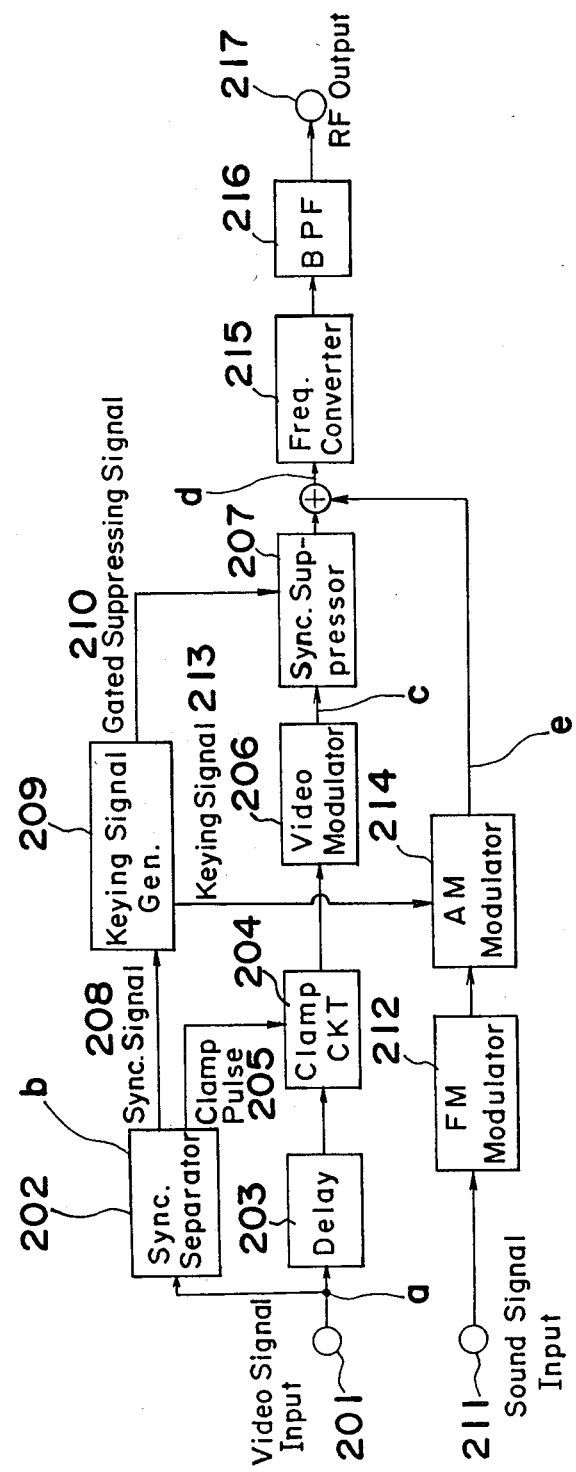
FIG. 2 is a circuit block diagram showing a scrambler.
Figure 3:
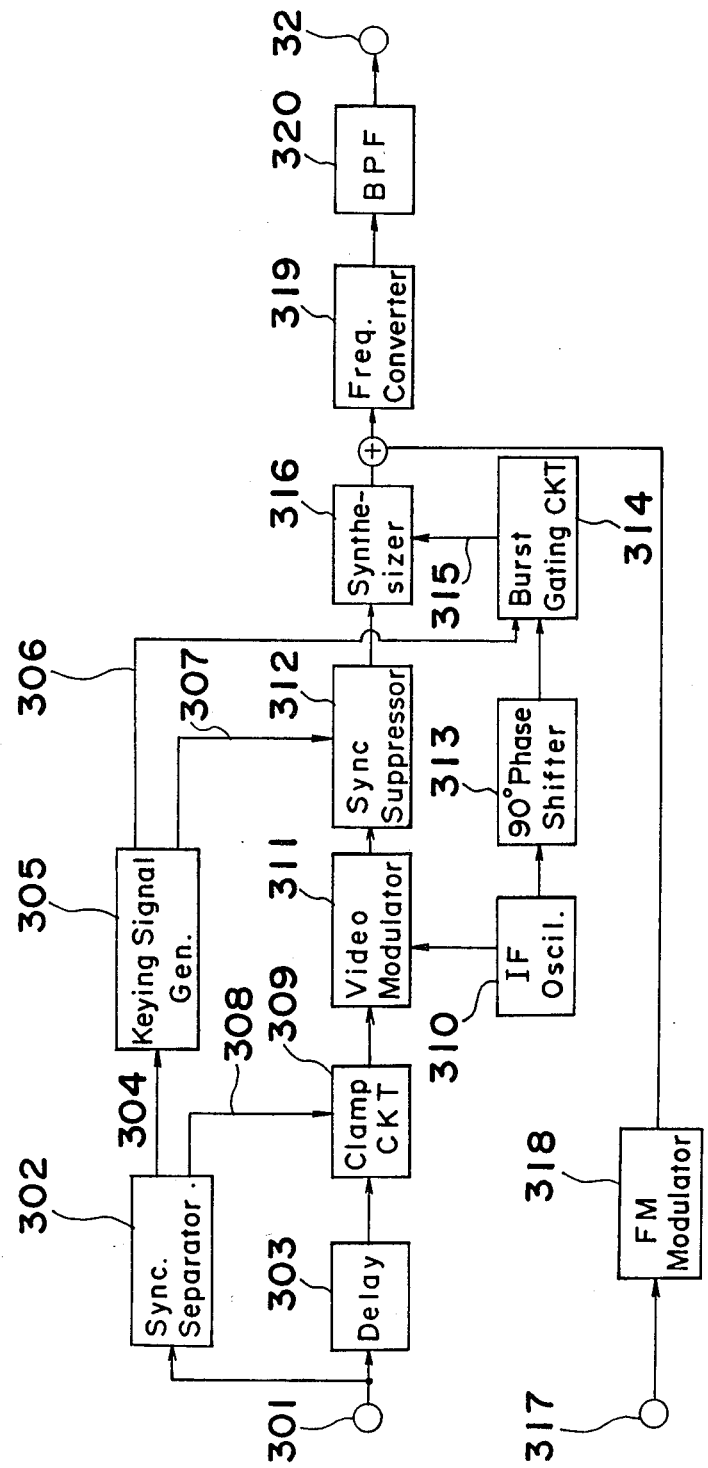
FIG. 3 is a circuit block diagram showing a scrambler according to a preferred embodiment of the present invention.

Referring to FIG. 3, there is shown a scrambler for producing a keying signal. A signal fed to a video signal input 301 is fed to both a sync separator 302 and a delay circuit 303. A synchronizing signal 304 separated from the video signal by the sync separator 302 is fed to a keying signal generator 305 from which a suppression gating signal 307 for suppressing the horizontal flyback period and a keying signal 306 for producing a burst signal displaced 90° in phase from the picture carrier
} wave are outputted. The video signal fed to the delay circuit 303 is DC-clamped in a clamp circuit 309 by a clamp pulse 308 fed from the sync separator 302 and is then amplitude-modulated in a video modulator 311 by an intermediate frequency carrier wave generated by an intermediate frequency oscillator 310. An output from the video modulator 311 represents a modulated wave similar to the waveform (c) shown in FIG. 1 and is fed to a sync suppressor 312 at which the horizontal flyback period is suppressed 6 dB by the suppression gating signal 307. The waveform of an output from the sync suppressor 312 is shown by (a) in FIG. 4 which is identical with the waveform (d) shown in FIG. 1. It is to be noted that the circuit construction so far described is identical with that according to the prior art.

Figure 4:
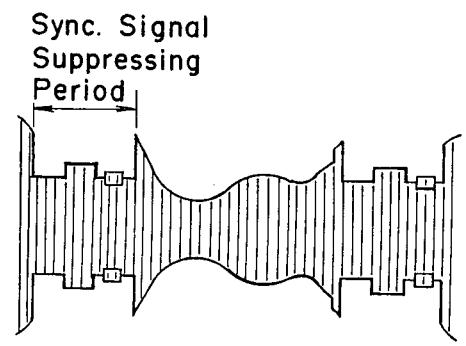
FIG. 4 is a diagram showing various waveforms of signals appearing in the scrambler.
Figure 4:
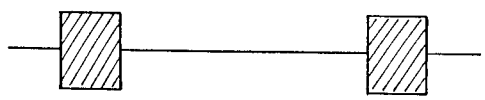
Figure 4:
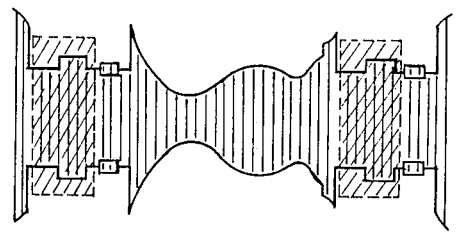

The intermediate frequency carrier wave generated by the IF oscillator 310 is shifted 90° in phase by a 90° phase shifter 313 and is then fed to a burst gating circuit 314 at which it is gated by the keying signal 306 to produce a burst signal 315 of a waveform shown by (b) in FIG. 4. At a synthesizer 316, the output from the suppressor 312 which has the waveform (a) shown in FIG. 4 and the burst signal 315 of the waveform (b) showin in FIG. 4 are combined together to produce a signal of a waveform shown by (c) in FIG. 4, wherein two carrier waves displaced 90° in phase from each other, but equal in frequency are superimposed on the horizontal flyback period. The output from the synthesizer 316 is combined with a sound signal which has been applied to a sound signal input 317 and then frequency-modulated by an FM modulator 318, and is, after having been converted by a frequency converter 319 to a predetermined frequency, outputted as an RF output 321 through a BPF circuit 320.

Figure 5:
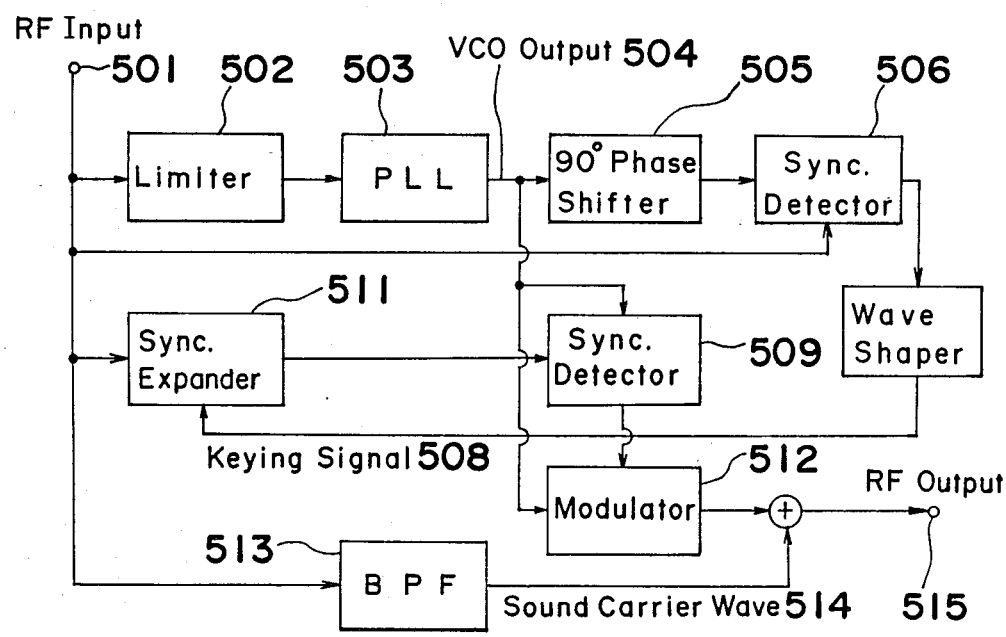
FIG. 5 is a circuit block diagram showing an apparatus for descrambling signals scrambled by the circuit of FIG. 3.

The output signal generated from the scrambler in the above described manner can be restored to the original waveform by a descrambler shown in FIG. 5.

Referring now to FIG. 5, the output signal from the scrambler is fed through an RF input 501 to a limiter 502. The video signal carrier wave which has been sufficiently amplified and limited by the limiter 502 and whose amplitude-modulated component has been removed is then fed to a PLL circuit 503 at which it is phase-locked with the carrier wave to produce a VCO (voltage controlled oscillator) output 504. The VCO output 504, after having been shifter 90° in phase by a 90° phase shifter 505, is applied to one of the two inputs of a sync detector 506. Since the other of the inputs of the sync detector 506 is connected directly with the RF input 501, the sync detector 506 detects the synchronization between the signals from the 90° phase shifter 505 and the RF input 501, respectively wherefore that portion where the burst signal of the waveform (b) shown in FIG. 4 is superimposed is extracted from the waveform (c) shown in FIG. 4. After having been shaped in waveform by a wave shaper 507, a keying signal 508 for restoring that portion where the sync signal is suppressed is outputted. This keying signal is an important signal utilized to restore to the original signal the signal which is scrambled according to the gated sync suppression principle. Since the signal fed to the RF input 501 is also fed to a sync expander 511, a portion of the horizontal flyback period in the video signal superimposed with a burst-like carrier wave shifted 90° in phase is expanded to the original level on the basis of the keying signal 508. The video signal whose sync suppressed portion has been expanded by the sync expander 511 cooperates with the VCO output 504 to detect a complete synchronization of the video signal thereby to produce a normal video signal of waveform similar to the waveform (a) shown in FIG. 1, from which the 90° phase-shifted burst-like carrier wave has been removed. The video signal is then modulated in a modulator 512 by the VCO output 504 as a carrier wave and is outputted in the form of a signal having the same picture carrier wave as that applied to the RF input 501. Also, from the signal applied to the RF input 501, a sound carrier wave 514 is filtered by a BPF circuit 513 and, after having been combined with an output from the modulator 512, is fed to a television receiver through an RF output 515 as the original, complete signal whereby picture information can be viewed in a descrambled form.

As hereinbefore described, the present invention is such that, unlike the prior art wherein the keying signal for descrambling is superimposed on the sound carrier wave, the signal displaced 90° in phase from the picture carrier wave is superimposed on the sync suppressed portion. Therefore, according to the present invention, not only can the buzzing interference which the keying signal brings about on the sound signal such as often observed in the prior art be advantageously eliminated, but also the multiplex sound signal can be freely transmitted by the use of the gated sync suppression scrambling system without the sound quality being adversely affected. Specifically, since in the present invention the keying signal is superimposed, as the carrier wave having different phase, on the sync suppressed portion, no keying signal can readily and easily be detected and therefore, no video signals can be reproduced by an unauthorized TV viewers.

Although the present invention has fully been described in connection with the preferred embodiment thereof with reference to the accompanying drawings, it is to be noted that various changes and modifications are apparent to those skilled in the art. By way of example, although the keying signal has been described as superimposed on the sync suppressed portion, the concept of the present invention can be equally applicable to the case wherein the keying signal is superimposed preceding the sync suppressed portion.

Accordingly, such changes and modifications are to be understood as included within the scope of the present invention as defined by the appended claims, unless they depart therefrom.

I claim:

1. A method of scrambling a communication signal comprising the steps of:
   (a) compressing a synchronizing signal component of a picture carrier wave which has been amplitude-modulated by a video signal; and
   (b) superimposing a keying signal, indicative of the period during which said synchronizing signal is compressed, on said picture carrier wave within or preceding said period, said keying signal being a carrier wave shifted 90° in phase from said picture carrier wave.

2. The method of claim 1, wherein the keying signal is a burst-like signal whose level is equal to or lower than the level of the picture carrier wave during the compressed period.

3. A scrambled signal generator which comprises:
   a keying signal generating means for generating in response to a synchronizing signal separated from a video signal both a suppression gating signal for suppressing the synchronizing signal and a keying signal indicative of that portion of the synchronizing signal which is suppressed;

a sync suppressing means for suppressing the picture carrier wave, which has been formed by amplitude-modulating a carrier wave by the video signal, by the use of the suppression gating signal;

a burst gating means for rendering the carrier wave, which has been shifted 90° in phase, to be a burst-like carrier wave by the use of the keying signal; and a synthesizing means for combining an output from the sync suppressing means and an output rom the burst gating means together.

4. A method for descrambling a scrambled communication signal composed of a picture carrier wave amplitude-modulated by a video signal wherein a synchronizing signal component has been compressed, and a keying signal indicative of the period of compression has been superimposed, said keying signal being a carrier wave shifted in phase by 90° from said picture carrier wave, comprising the steps of:

(a) producing a VCO output signal by phase-locking said scrambled signal;

(b) shifting the phase of said VCO signal by 90°;

(c) extracting said keying signal from said shifted VCO output signal; and (d) expanding said compressed synchronizing signal component by the use of said keying signal.

5. An apparatus for use with the method of claim 4 which comprises:

means for phase-locking said scrambled picture carrier wave to produce the VCO output which has been phase-locked with the carrier wave;

a 90° phase shifter for shifting 90° the phase of the VCO output;

a first synchronization detector for extracting the keying signal from an output from the 90° phase shifter;

a sync expanding means for expanding said compression period by the use of the keying signal; and a second synchronization detector for detecting the video signal by the use of an output from the sync expanding means and the VCO output.

6. A method for scrambling and restoring a communication signal comprising the steps of:

(a) compressing a synchronizing signal component of a picture carrier wave which has been amplitude-modulated by a video signal;

(b) superimposing a keying signal, indicative of the period during which said synchronizing signal is compressed, on said picture carrier wave within or preceding said period, said keying signal being a carrier wave shifted 90° in phase from said picture carrier wave;

(c) phase-locking said picture carrier wave to produce a VCO output signal;

(d) phase-shifting said VCO signal by 90°;

(e) extracting said keying signal from said phase-shifted VCO signal; and (f) expanding said compressed synchronizing signal component by the use of said keying signal.

7. A scrambled signal transmitting and receiving apparatus for use with the method of claim 6, which comprises:

a keying signal generating means for generating in response to a synchronizing signal separated from a video signal both a suppression gating signal for compressing the synchronizing signal and a keying signal indicative of that portion of the synchronizing signal which is compressed;

a sync suppressing means for compressing the picture carrier wave, which has been formed by amplitude-modulating a carrier wave by the video signal, by the use of the suppression gating signal;

a burst gating means for rendering the carrier wave, which has been shifted 90° in phase, to be a burst-like carrier wave by the use of the keying signal;

means for combining an output from the sync suppressing means and an output from the burst gating means together and for phase-locking a scrambled picture carrier wave to produce the VCO output which has been phase-locked with the carrier wave;

a 90° phase shifter for shifting 90° the phase of the VCO output;

a first synchronization detector for extracting the keying signal from an output from the 90° phase shifter;

a sync expanding means for expanding said compression period by the use of the keying signal; and a second synchronization detector for detecting the video signal by the use of an output from the sync expanding means and the VCO output.

* * * * *